United States Patent
Smith et al.

(10) Patent No.: US 6,697,099 B2
(45) Date of Patent: *Feb. 24, 2004

(54) METHOD AND APPARATUS FOR DISPLAYING A COLORED AUDIO/VISUAL PROGRAM

(75) Inventors: Eric O. Smith, Scotts Valley, CA (US); Anthony A. Shah-Nazaroff, Santa Clara, CA (US); Jean M Goldschmidt Iki, San Jose, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 09/183,496

(22) Filed: Oct. 30, 1998

(65) Prior Publication Data

US 2001/0043268 A1 Nov. 22, 2001

(51) Int. Cl.$^7$ ................................................. H04N 7/18
(52) U.S. Cl. ........................................... 348/35; 348/29
(58) Field of Search .............................. 348/29, 30, 31, 348/101, 104, 577, 578, 35, 36; 345/328, 349

(56) References Cited

U.S. PATENT DOCUMENTS

| 5,050,984 | A | * | 9/1991 | Geshwind | .................... 348/552 |
|---|---|---|---|---|---|
| 5,412,773 | A | | 5/1995 | Carlucci et al. | |
| 5,475,835 | A | * | 12/1995 | Hickey | ........................ 395/600 |
| 5,760,767 | A | | 6/1998 | Shore et al. | |
| 5,790,236 | A | * | 8/1998 | Hershtik et al. | ............... 352/12 |
| 5,844,620 | A | * | 12/1998 | Coleman et al. | ............ 348/461 |
| 6,052,676 | A | * | 4/2000 | Hekmatpour | ................. 706/11 |
| 6,088,066 | A | * | 7/2000 | Westerman | ................. 348/643 |
| 6,124,893 | A | * | 9/2000 | Stapleton | .................... 348/441 |
| 6,185,367 | B1 | * | 2/2001 | Keery et al. | ................. 386/122 |
| 6,253,375 | B1 | * | 6/2001 | Gordon et al. | ................. 725/88 |
| 6,305,019 | B1 | * | 10/2001 | Dyer et al. | ................. 725/117 |

OTHER PUBLICATIONS

PCT Search Report. PCT/US99/25376, Feb. 22, 2000, 4 pages.

* cited by examiner

Primary Examiner—Andy Rao
(74) Attorney, Agent, or Firm—Crystal D. Sayles

(57) ABSTRACT

A method and apparatus for displaying colored audio/visual programming in black and white is described. The present invention provides a method and apparatus for determining whether a selected audio/visual program is colored. A display device that is used to display the selected audio/visual program is configured, responsive to user input, to display the selected audio/visual program in black and white. In one embodiment, automatic configuration of the display device to display the selected audio/visual program in black and white is user enabled. In one embodiment, the colored audio/visual program has been colorized.

29 Claims, 4 Drawing Sheets

SHOW ID

SHOW TITLE

.

.

.

COLOR CODE

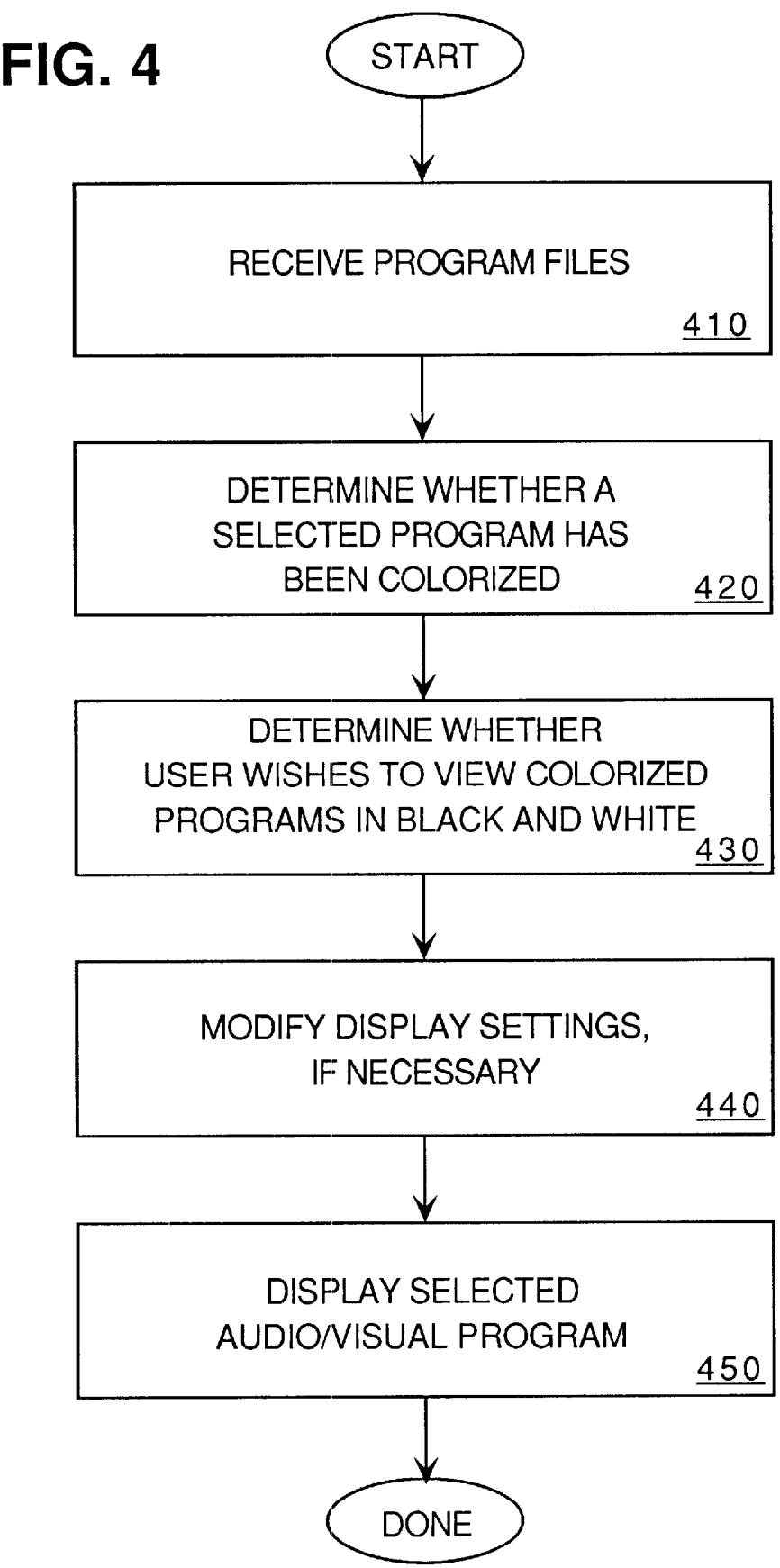

METHOD AND APPARATUS FOR DISPLAYING A COLORED AUDIO/VISUAL PROGRAM

FIELD OF THE INVENTION

The present invention relates to audio/visual programming. More particularly, the present invention relates to customization of display of audio/visual programming.

BACKGROUND

Many classic black and white movies and other audio/visual programming (e.g., cartoons, sporting events) have been "colorized" in order to take advantage of improvements in video technology that have been developed after the program was originally recorded. The term "colorized" and "colorization" refer to a process that adds color to an originally black and white program. Colors are selected by an editor and applied to the original program with a computerized system. The resulting program is a colorized program.

However, many people, including many classic programming fans, prefer black and white movies to colored and colorized programming. Therefore, controversy often exists over which version of a movie should be broadcast by broadcasters or stocked by audio/visual libraries. This controversy results in excessive copies of programs and/or dissatisfied customers.

What is needed is a method and apparatus for allowing colored movies or other audio/visual programming to be viewed in black and white by viewers who prefer to view programming in black and white.

SUMMARY OF THE INVENTION

A method and apparatus for automatically displaying colored audio/visual programs in black and white is described. Colored images of an audio/visual program are received. The audio/visual program is displayed, responsive to user input, with reduced color to provide a display of the audio/visual program in black and white. In one embodiment, the colored images are colorized images. In one embodiment, reduced color is provided by reducing the color setting of a display device.

BRIEF DESCRIPTION OF THE DRAWINGS

The present invention is illustrated by way of example, and not by way of limitation, in the figures of the accompanying drawings in which like reference numerals refer to similar elements.

FIG. 3 is a audio/visual program file according to one embodiment of the present invention.

FIG. 4 is a flow chart for automatically displaying a colored audio/visual program in black and white according to one embodiment of the present invention.

DETAILED DESCRIPTION

A method and apparatus for automatically displaying colored audio/visual programming in black and white is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Briefly, the present invention provides a method and apparatus for determining whether a selected audio/visual program is colored. A display device that is used to display the selected audio/visual program is configured, responsive to user input, to display the selected audio/visual program in black and white. In one embodiment, automatic configuration of the display device to display the selected audio/visual program in black and white is user enabled. In one embodiment, the colored audio/visual program has been colorized.

Figure 1:
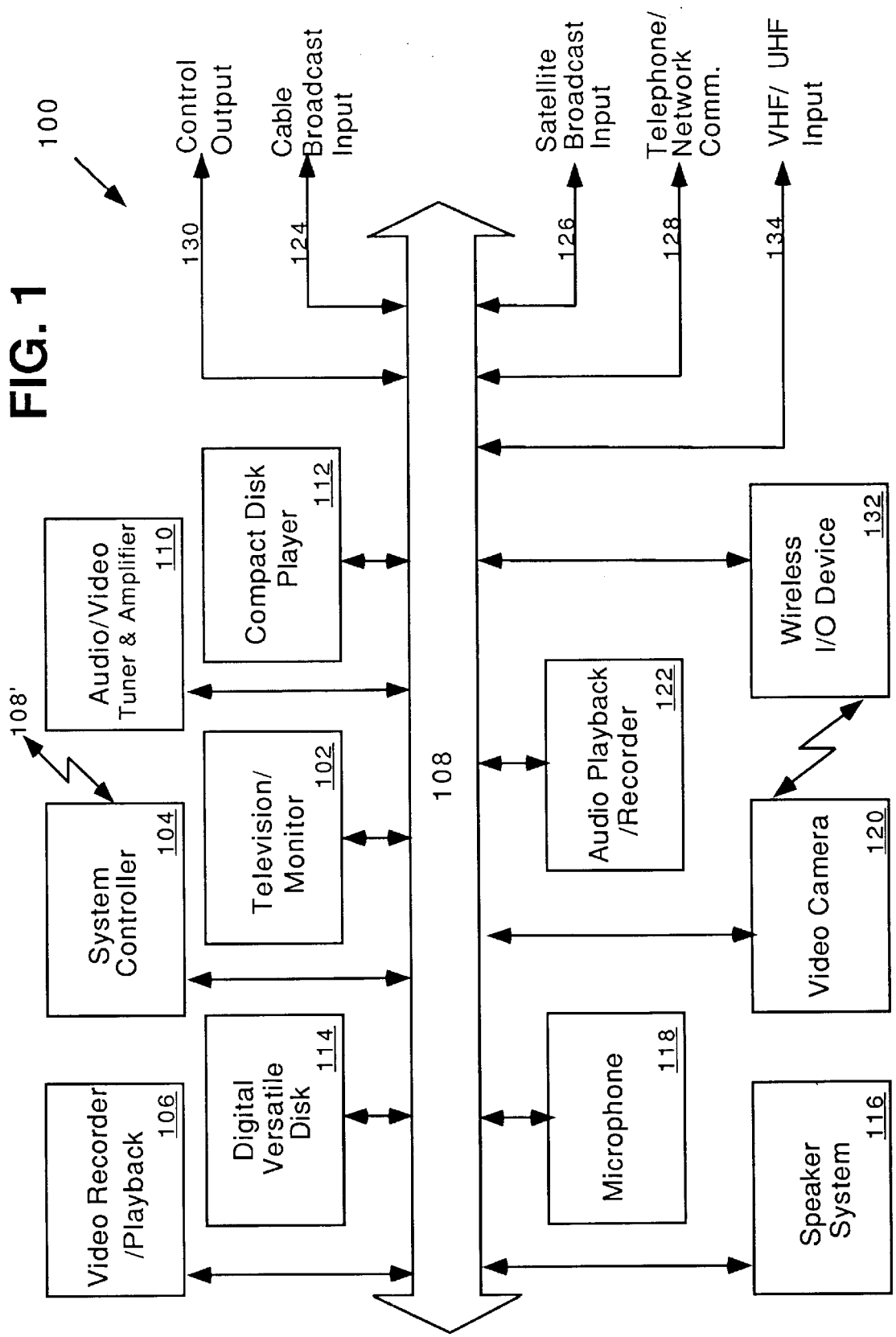
FIG. 1 is a block diagram illustrating the system components of an exemplary entertainment system in which one embodiment of the present invention may be practiced.

FIG. 1 is a block diagram illustrating the system components of an exemplary entertainment system in which one embodiment of the present invention may be practiced. System 100 includes television/display device 102, video recorder/playback device 106, digital video disk (DVD, also referred to as digital versatile disk) recorder/playback device 114, audio/video tuner and/or amplifier 110, audio playback/recorder device 122, and compact disc (CD) player 112, all coupled to a common input/output (I/O) bus 108.

It is to be appreciated that the use of the common I/O bus 108 is for ease of explanation in the diagram only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394–1995, draft 8.0v3, approved Dec. 12, 1995.

In addition, system 100 includes speaker system 116, microphone 118, video camera 120 and a wireless input/output control device 132. In one embodiment, wireless I/O control device 132 is an entertainment system remote control unit which communicates with the components of system 100 through IR signals. In another embodiment, wireless I/O control device 132 may be a wireless keyboard and/or cursor control device that communicates with the components of system 100 through IR signals or RF signals. In yet another embodiment, wireless I/O control device 132 may be an IR or RF remote control device similar in appearance to a typical entertainment system remote control with the added feature of a track-ball or other cursor control mechanism that allows a user to position a cursor on a display of system 100.

At the core of system 100 is system controller 104 incorporated with the features of the present invention, configured to control a variety of features associated with the system components. As depicted, system controller 104 is coupled to each of the system components, as necessary, through I/O bus 108. In one embodiment, in addition to or in place of I/O bus 108, system controller 104 may be configured with a wireless communications transmitter (or transceiver), which is capable of communicating with the system components via IR signals or RF signals 108'.

Regardless of the control medium, system controller 104 is configured to control each of the entertainment system components of system 100, although it is understood that each of the components may be individually controlled with wireless I/O device 132.

System controller 104 retrieves and stores entertainment programming information available from a wide variety of sources. During operation of system 100, system controller 104 dynamically configures the operating parameters of system 100 and offers additional value added features to enhance the user's enjoyment of system 100, as discussed in more detail below. In one embodiment, system controller 104 may be a computer system incorporated with the teachings of the present invention, as will be discussed in further detail below. In another embodiment, system controller 104 may be a "set-top" box endowed with the necessary processing power and incorporated with the teachings of the present invention. Regardless of the particular embodiment, system controller 104 may also be referred to as a "convergence system" designed to integrate the world of entertainment systems and computing platforms to achieve the beneficial results discussed in greater detail below.

Although the present invention is described in the context of the exemplary embodiments presented in the figures, based on the descriptions to follow, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1. By way of example, devices may be added to system 100, or devices (e.g., video camera 120, microphone 118, DVD recorder/playback device 114, etc.) may be removed from system 100.

As illustrated in FIG. 1, system 100 can be configured to receive audio/video programming input from a wide variety of sources. In one embodiment, system 100 receives programming input from any or all of the following sources: digital broadcast (e.g., HDTV), cable broadcast 124, satellite broadcast 126 (e.g., via a satellite dish), very high frequency (VHF) or ultra high frequency (UHF) radio frequency communication of the broadcast networks 134 (e.g., via an aerial antenna), and/or the telephone/computer network interface 128. Further, it will be appreciated by those skilled in the art that cable broadcast input 124, satellite broadcast input 126 and VHF/UHF input 134 may include analog and/or digital programming. Additionally, audio/video programming may be received from a CD-ROM, DVD, or other digital or analog storage device via a playback device of system 100 (e.g., DVD recorder/playback device 114). The Internet, an entertainment network, or other network may also provide audio/video programming, via, for example, interface 128.

In addition to programming input, system 100 is also configured with a number of general purpose control outputs 130 which may be configured to control any number of devices. In one embodiment, for example, as system controller 104 configures system 100 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention (to be more fully described below), system controller 104 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 104 may be altered, allowing it to better visually fit into system 100.

It is also to be appreciated that the several entertainment system components depicted in FIG. 1 can be beneficially combined. By way of example, system controller 104 could be integrated into television/display device 102, DVD recorder/playback device 114, or audio/video tuner and amplifier 110.

Figure 2:
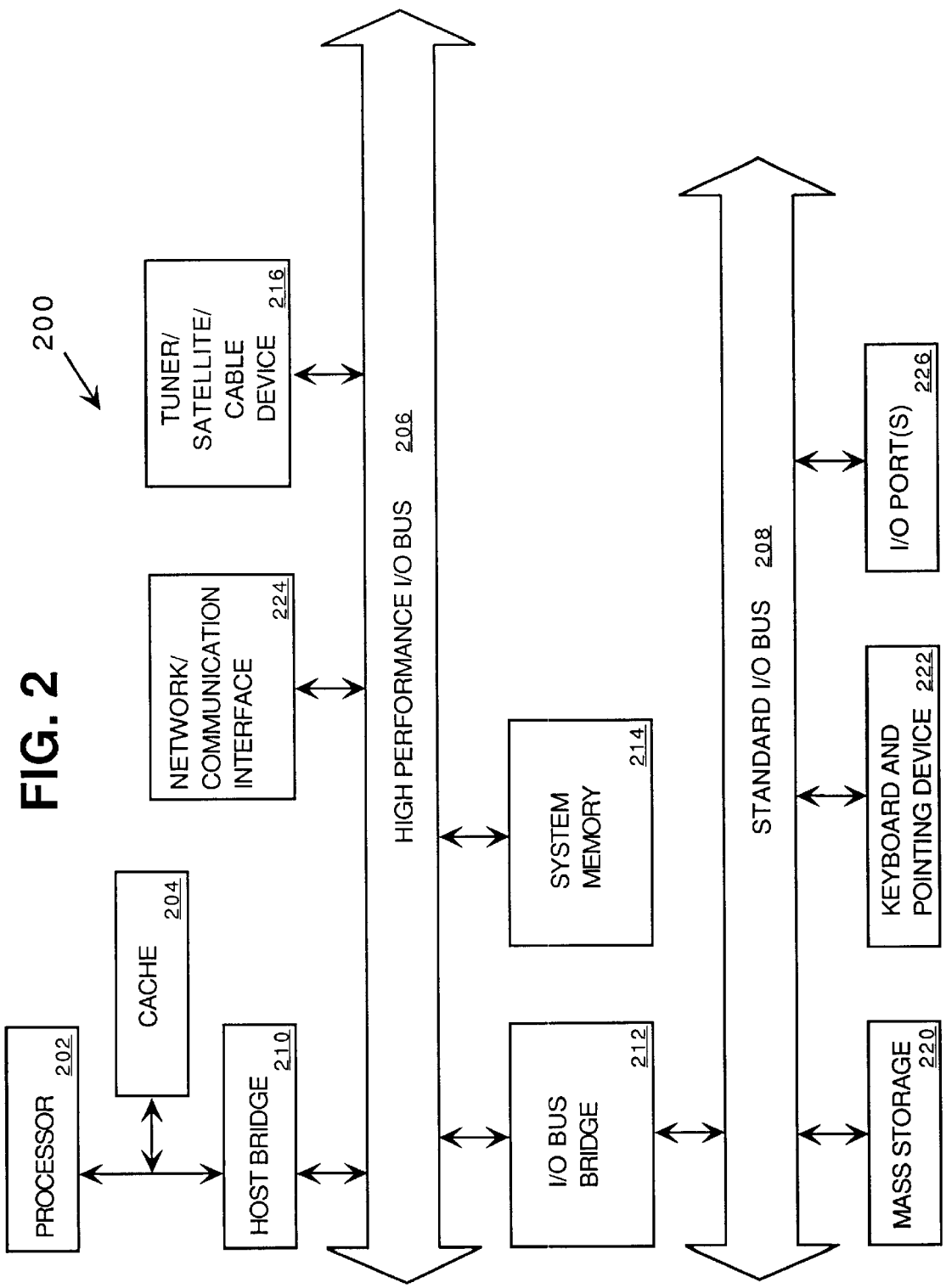
FIG. 2 illustrates one embodiment of a computing device suitable for use with the present invention.

FIG. 2 illustrates one embodiment of a computing device suitable for use with the present invention. According to one implementation, system controller 104 of FIG. 1 is a computing device 200 of FIG. 2. In the illustrated embodiment of FIG. 2, device 200 includes processor 202 and cache memory 204 coupled to each other as shown. Additionally, device 200 includes high performance input/output (I/O) bus 206 and standard I/O bus 208. Host bridge 210 couples processor 202 to high performance I/O bus 206, whereas I/O bus bridge 212 couples the two buses 206 and 208 to each other. Coupled to bus 206 are network/communication interface 224 and system memory 214. Coupled to bus 208 is mass storage 220, keyboard and pointing device 222, and I/O ports 226. Collectively, these elements are intended to represent a broad category of hardware systems, including but not limited to general purpose computer systems based on the Pentium® processor, Pentium® Pro processor, or Pentium® II processor, manufactured by Intel Corporation.

In one embodiment, various electronic devices are also coupled to high performance I/O bus 206. As illustrated, analog tuner/digital satellite/cable devices 228, are also coupled to high performance I/O bus 206 to allow device 200 to "tune" to various programming input channels.

These elements 202–228 perform their conventional functions known in the art. In particular, network/communication interface 224 is used to provide communication between device 200 and any of a wide range of conventional networks, such as an Ethernet, token ring, the Internet, etc. It is to be appreciated that the circuitry of interface 224 is dependent on the type of network the device 200 is being coupled to.

Mass storage 220 is used to provide permanent storage for the data and programming instructions to implement the above described functions, whereas system memory 214 is used to provide temporary storage for the data and programming instructions when executed by processor 202. I/O ports 226 are one or more serial and/or parallel communication ports used to provide communication between additional peripheral devices which may be coupled to device 200.

It is to be appreciated that various components of device 200 may be re-arranged. For example, cache 204 may be on-chip with processor 202. Alternatively, cache 204 and processor 202 may be packaged together as a "processor module", with processor 202 being referred to as the "processor core". Furthermore, certain implementations of the present invention may not require nor include all of the above components. For example, mass storage 220, keyboard and pointing device 222, and/or network/communication interface 224 may not be included in device 200. Additionally, the peripheral devices shown coupled to standard I/O bus 208 may be coupled to high performance I/O bus 206; in addition, in some implementations only a single bus may exist with the components of device 200 being coupled to the single bus. Furthermore, additional components may be included in device 200, such as additional processors, storage devices, or memories.

In one embodiment, the method and apparatus for displaying colored audio/visual programming in black and white according to the present invention as discussed above is implemented as a series of software routines run by device 200 of FIG. 2. In this embodiment, the process of FIG. 4 is implemented as a series of software routines. These software routines comprise a plurality or series of instructions to be executed by a processor in a hardware system, such as processor 202 of FIG. 2.

Initially, the series of instructions are stored on a storage device, such as mass storage 220. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 224. The instructions are copied from the storage device, such as mass storage 220, into memory 214 and then accessed and executed by processor 202. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, the process of FIG. 4 could be implemented in one or more ASICs of an additional circuit board for insertion into hardware system 200 of FIG. 2.

Figure 3:
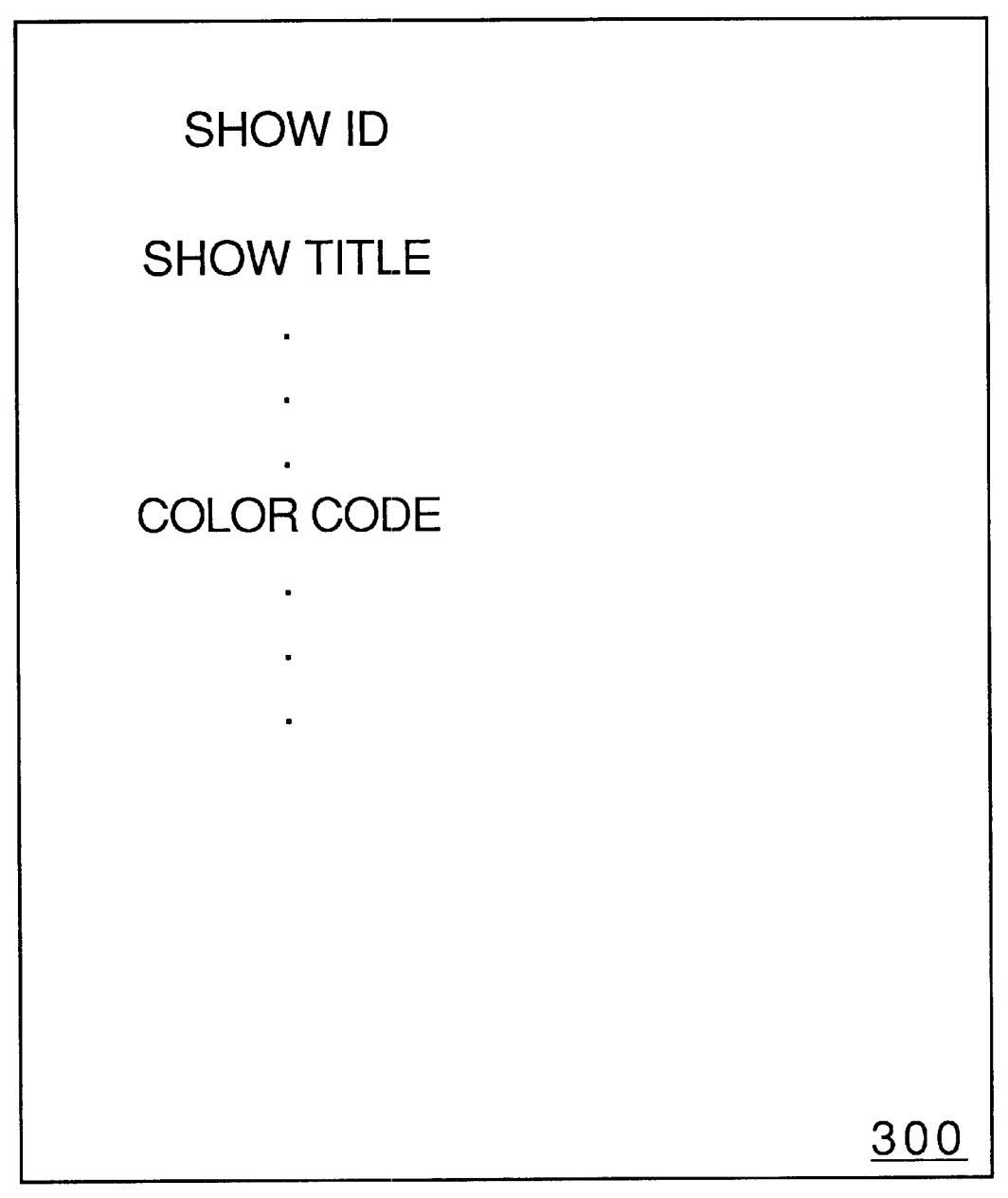

FIG. 3 is an audio/visual program file according to one embodiment of the present invention. In general, a program file contains information related to an associated audio/visual program. In one embodiment, a program file is transmitted with the associated audio/visual program. Alternatively, one or more program files can be transmitted independent of the audio/visual program.

Program file 300 includes information related to an audio/visual program such as a ShowID, a ShowTitle, a ColorCode, etc. Of course, additional or different information can be included in program file 300. In one embodiment, the ColorCode is used to indicate whether the associated audio/visual program is a colored program. As described in greater detail below, the entertainment system of the present invention provides the ability to automatically display colored programs in black and white or with a reduced color setting.

In one embodiment, a ColorCode field in program file 300 indicates whether the associated audio/visual program is black and white, colorized, or originally recorded in color. Alternatively, other ColorCode schemes can also be used to convey color information related to an audio/visual program.

Program file 300 can also include an original recording date for an audio/visual program (not shown in FIG. 3). The original recording date can be used to determine whether the associated audio/visual program should be displayed in color or in black and white. For example, a user could select automatic black and white display of all audio/visual programs recorded before 1955. Other information that can be stored in program file 300 can also be used to select audio/visual programs to be viewed in black and white.

FIG. 4 is a flow chart for automatically displaying a colored audio/visual program in black and white according to one embodiment of the present invention. The entertainment system of the present invention receives one or more program files, 410. As described above, the program file(s) can be received with, or prior to, receiving the associated audio/visual program or the program file(s) can be received independent of the time at which the associated audio/visual program is received.

The entertainment system of the present invention determines whether a selected audio/visual program is colored, 420. In one embodiment, the entertainment system checks a field/entry in a program file to determine whether the associated program is colored. In such an embodiment, a network, a program syndicator, or other person or group provides the program file indicating whether the audio/visual program is colored, among other characteristics.

In an alternative embodiment, a specific signal or indicator can be transmitted that is not part of the program file to indicate whether the audio/visual program is colored. For example, a predetermined portion of an opening frame can be used to indicate that the audio/visual program is colored. Color information can also be communicated in many other manners.

The entertainment system determines whether a user of the system wishes to view colored programming in black and white, 430. In one embodiment, this is accomplished by providing the user with a menu in which he/she can select between viewing colored programming in color or in black and white. Alternatively, the entertainment system can prompt the user for a response prior to displaying an audio/visual program that in color. Alternative schemes can also be implemented to determine whether the user wishes to view the audio/visual program in color or black and white.

Determining whether a program is colored and determining whether the user wishes to view colored programming in black and white can be performed in any order. In one embodiment, the entertainment system determines whether the audio/visual program has been colored prior to determining whether the viewer wishes to see such programming in black and white. In an alternative embodiment, the entertainment system determines whether the user wishes to view colored programming in black and white prior to determining whether an audio/visual program is colored.

The entertainment system modifies color settings of a display device upon which the audio/visual program is to be displayed if necessary, 440. In one embodiment, the color setting of the display device is set to its minimum. Alternatively, the color setting can be reduced to provide a black and white display with more depth than would otherwise be provided with the minimum color setting.

In one embodiment, the entertainment system described herein provides software control of display settings (e.g., color, tint, contrast). When a program is to be displayed in black and white, the control circuitry of the entertainment system modifies the color settings accordingly. Alternatively, if the display device is an ordinary television having wireless (e.g., remote) control of display settings, the control circuitry provides signals that cause the color settings of the television to change such that a program is displayed in black and white. The signals causing the color settings to change can be communicated, for example, via the interface that communicates audio/visual programming to the display device. Wireless signals (e.g., RF, IR) could also be used to automatically change the color settings of the display device.

The selected audio/visual program is displayed, 450. In one embodiment, color settings are restored to the original settings after the selected audio/visual program has been displayed (not shown in FIG. 4). Alternatively, the entertainment system could prompt the user to determine whether the original color settings should be restored.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for displaying multimedia programs, the method comprising:
   receiving an audio/visual program;
   accessing a program file, the program file including a field that indicates whether the audio/visual program is colorized, wherein the field is checked to determine whether the audio/visual program is colorized;
   determining whether a user wishes to view the audio/visual program in black and white;
   if the audio/visual program is colorized, and if the user wishes to view the audio/visual program in black and white, then
      modifying at least one color setting of a display device in which the audio/visual program is to be displayed; and
      displaying the audio/visual program in black and white.

2. The method of claim 1 wherein displaying the audio/visual program in black and white comprises decreasing the at least one color setting of the display device such that the audio/visual program is displayed in black and white.

3. The method of claim 2 wherein decreasing the at least one color setting of the display device comprises setting the at least one color setting of the display device to a minimum setting.

4. The method of claim 2 wherein decreasing the at least one color setting of the display device comprises reducing the at least one color setting of the display device to a level higher than a minimum setting to provide a black and white display with more depth than the minimum setting would provide.

5. A machine readable medium having stored thereon sequences of instructions, which when executed by a processor cause the processor to perform operations comprising:
   receiving an audio/visual program;
   accessing a program file, the program file including a field that indicates whether the audio/visual program is colorized, wherein the field is checked to determine whether the audio/visual program is colorized;
   determining whether a user wishes to view the audio/visual program in black and white;
   if the audio/visual program is colorized, and the user wishes to view the audio/visual program in black and white, then
      modifying at least one color setting of a display device in which the audio/visual program is to be displayed; and
      displaying the audio/visual program in black and white.

6. The machine-readable medium of claim 5 further comprising sequences of instructions that cause the processor to decrease the at least one color setting of the display device such that the audio/visual program is displayed in black and white.

7. The machine-readable medium of claim 6 wherein the sequences of instructions for decreasing the at least one color setting cause the at least one color setting of the display device to be set to a minimum setting.

8. The machine-readable medium of claim 5 further comprising sequences of instructions that cause the processor to perform further operations comprising reducing the at least one color setting of the display device to a level higher than a minimum setting to provide a black and white display with more depth than the minimum setting would provide.

9. An apparatus for displaying multimedia programs, the apparatus comprising:
   means for receiving an audio/visual program;
   means for accessing a program file, the program file including a field that indicates whether the audio/visual program is colorized, wherein the field is checked to determine whether the audio/visual program is colorized;
   means for determining whether a user wishes to view the audio/visual program in black and white;
   if the audio/visual program is colorized, and if the user wishes to view the audio/visual program in black and white,
      means for then modifying at least one color setting of a display device in which the audio/visual program is to be displayed; and
      means for displaying the audio/visual program in black and white.

10. The apparatus of claim 9 further comprising means for decreasing the at least one color setting of the display device such that the audio/visual program is displayed in black and white.

11. The apparatus of claim 10 wherein the at least one color setting of the display device is set to a minimum setting.

12. The apparatus of claim 9 further comprising means for reducing the at least one color setting of the display device to a level higher than a minimum setting to provide a black and white display with more depth than the minimum setting would provide.

13. An entertainment system comprising:
   an audio/visual program source to provide an audio/visual program;
   a display device to display the audio/visual program; and
   a system controller coupled to the program source and the display device, the system controller configured to access a program file, the program file including a field that indicates whether the audio/visual program is colorized, wherein the system controller checks the field of the program file to determine whether the audio/visual program from the program source is colorized, to determine whether a user wishes to view the audio/visual program in black and white and if the audio/visual program is colorized, and if the user wishes to view the audio/visual program in black and white, then to modify at least one color setting of the display device to enable the display device to display the audio/visual program in black and white.

14. The entertainment system of claim 13 wherein the system controller causes the audio/visual program to automatically be displayed in black and white if the audio/visual program is colorized and if a user-configurable indicator has been set to indicate that colorized audio/visual programs are to be displayed in black and white.

15. The entertainment system of claim 13 wherein the at least one color setting of the display device is set to a minimum to display the audio/visual program in black and white.

16. The entertainment system of claim 13 wherein the at least one color setting of the display device is reduced to a level higher than a minimum setting to provide a black and white display with more depth than the minimum setting would provide.

17. The entertainment system of claim 13 wherein the system controller determines whether the audio/visual program from the audio/visual program source is colorized and if there is a user preference for black and white, then causes the display device to display the odorized audio/visual program in black and white.

18. The entertainment system of claim 13 wherein the system controller determines whether the audio/visual program is colorized based on an original date of the audio/visual program, wherein the original date of the audio/visual program is included in the program file.

19. The method of claim 1 wherein receiving an audio/visual program comprises receiving a broadcast transmission of the audio/visual program together with the program file that indicates whether the associated audio/visual program is colorized.

20. The method of claim 1 wherein determining whether the audio/visual program is colorized comprises checking the program file for an original date for the audio/visual program and using the original date to determine if the program is colorized.

21. The method of claim 1 wherein determining whether a user wishes to view a the audio/visual program in black and white comprises providing the user with a menu for selecting whether to view colorized audio/visual programs in black and white.

22. The method of claim 1 wherein determining whether a user wishes to view the audio/visual program in black and white comprises prompting the user for a response prior to displaying the audio/visual program.

23. The apparatus of claim 9 wherein the means for accessing a program file comprises means for checking the program file for an original date for the audio/visual program and using the original date to determine if the audio/visual program is colorized.

24. The method of claim 1, wherein the at least one color setting of the display device comprises at least one of a color setting, a tint setting, and a contrast setting.

25. A method for viewing multimedia on an entertainment system, comprising:
    receiving an audio/visual program;
    receiving a program file, the program file being associated with the audio/visual program, the program file including a field, the field comprising an original date in which the audio/visual program was filmed, the original date for indicating whether the associated audio/visual program is colorized;
    determining whether a user preference for viewing the audio/visual program in black and white is set;
    if the audio/visual program is colorized and the user preference for viewing the audio/visual program is set, modifying at least one color setting of a display device in which the audio/visual program is to be displayed; and
    displaying the colorized audio/visual program in black and white; and if the user preference for viewing the audio/visual program is not set,
    displaying the audio/visual program in the format in which the audio/visual program was received.

26. The method of claim 25, wherein the at least one color setting of a display device comprises at least one of a color setting, a tint setting, and a contrast setting.

27. The method of claim 25, wherein displaying the colorized audio/visual program in black and white comprises decreasing the at least one color setting of the display device such that the audio/visual program is displayed in black and white.

28. The method of claim 27 wherein decreasing the at least one color setting of the display device comprises setting the at least one color setting of the display device to a minimum setting.

29. The method of claim 27 wherein decreasing the at least one color setting comprises reducing the at least one color setting of the display device to a level higher than a minimum setting to provide a black and white display with more depth than the minimum setting would provide.

* * * * *